(12) United States Patent
Stuntebeck et al.

(10) Patent No.: US 11,182,214 B2
(45) Date of Patent: Nov. 23, 2021

(54) ALLOCATING COMPUTING RESOURCES BASED ON PROPERTIES ASSOCIATED WITH LOCATION

(71) Applicant: VMware, Inc., Palo Alto, CA (US)

(72) Inventors: Erich Peter Stuntebeck, Johns Creek, GA (US); Ravish Chawla, Chamblee, GA (US); Kar Fai Tse, Peachtree Corners, GA (US)

(73) Assignee: VMware, Inc., Palo Alto, CA (US)

( * ) Notice: Subject to any disclaimer, the term of this patent is extended or adjusted under 35 U.S.C. 154(b) by 167 days.

(21) Appl. No.: 16/451,632

(22) Filed: Jun. 25, 2019

(65) Prior Publication Data

US 2020/0409761 A1 Dec. 31, 2020

(51) Int. Cl.
*G06F 9/50* (2006.01)
*G06N 20/00* (2019.01)
*G06K 19/00* (2006.01)
*G06F 9/455* (2018.01)
*G06K 19/07* (2006.01)

(52) U.S. Cl.
CPC .......... *G06F 9/5027* (2013.01); *G06F 9/5077* (2013.01); *G06K 19/0723* (2013.01); *G06N 20/00* (2019.01); *G06F 9/45533* (2013.01); *G06F 9/45541* (2013.01)

(58) Field of Classification Search
CPC ............... G06F 9/5027; G06F 9/45541; G06F 9/45533; G06F 9/4557; G06F 9/45575; G06F 9/4803; G06F 9/4843; G06F 9/5077; G06N 20/00; G06N 20/10; G06N 20/20; G06K 19/0723; G06K 19/0725; H04L 67/22
USPC ................. 712/28, 29, 30, 35, 36, 227, 225; 718/1–108; 706/12; 709/203, 236
See application file for complete search history.

(56) References Cited

U.S. PATENT DOCUMENTS

| | | | |
|---|---|---|---|
| 2006/0093118 A1* | 5/2006 | Agrawal | H04M 3/42357 379/211.02 |
| 2012/0036251 A1* | 2/2012 | Beaty | H04L 43/08 709/224 |
| 2016/0092785 A1* | 3/2016 | Takaya | G06N 7/005 706/11 |
| 2016/0180222 A1* | 6/2016 | Sierhuis | G06F 7/023 706/47 |
| 2017/0031913 A1* | 2/2017 | Favreau-Lessard | H04W 4/021 |
| 2018/0197099 A1* | 7/2018 | Liang | G06N 7/005 |
| 2020/0169464 A1* | 5/2020 | Ramareddy | H04L 41/0896 |

* cited by examiner

*Primary Examiner* — Daniel H Pan
(74) *Attorney, Agent, or Firm* — Thomas | Horstemeyer LLP

(57) ABSTRACT

Various examples are disclosed for predictive allocation of computing resources based on the predicted location of a user. A computing environment can generate a predictive usage model that predicts a location of a user and allocate computing resources, such as VDI sessions or VMs, to a host device that optimizes latency to the predicted location.

17 Claims, 4 Drawing Sheets

ALLOCATING COMPUTING RESOURCES BASED ON PROPERTIES ASSOCIATED WITH LOCATION

BACKGROUND

Users in enterprise environment are increasingly mobile. Some users may work remotely from home, other users may travel frequently between various offices of an enterprise, and some users might work exclusively on the road from hotels, coffee shops, and the like. Additionally, enterprises are increasingly utilizing virtual desktop infrastructure (VDI) environments and other virtualized computing environments to provide users with a consistent and secure computing environment. Providing a VDI environment requires creating a virtualized version of a physical device, such as a server, a storage device, a central processing unit (CPU), a graphics processing unit (GPU), or other computing resources that can accessed through a VDI client by a remote user. Other remote or virtualized computing resources can also be provided to users. For instance, a virtual machine (VM) is an emulation of a computer system and can be customized to include, for example, a predefined amount of random access memory (RAM), hard drive storage space, as well as other computing resources that emulate a physical machine. As virtual machines resemble physical computer architectures, virtual machines can provide the equivalent functionality of a physical computer. Virtual machines can be executed remotely, in a data center for example, to provide remote desktop computer sessions for employees of an enterprise.

In an environment where workers are increasingly mobile and remote, providing a low latency and pleasant user experience can be difficult, particularly when the location of the user changes often. For example, in the VDI context, a user might be working from the East coast on one day and on the West coast the next day. When the user logs into his VDI session from the West coast, if his VDI session is provided by a machine on the East coast, the latency of a session might be unacceptable. Similarly, other computing resources, such as a containerized environment running in a particular data center that is running a published application, the user's email server, directory service controller, can also be affected by latency associated with a user's location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
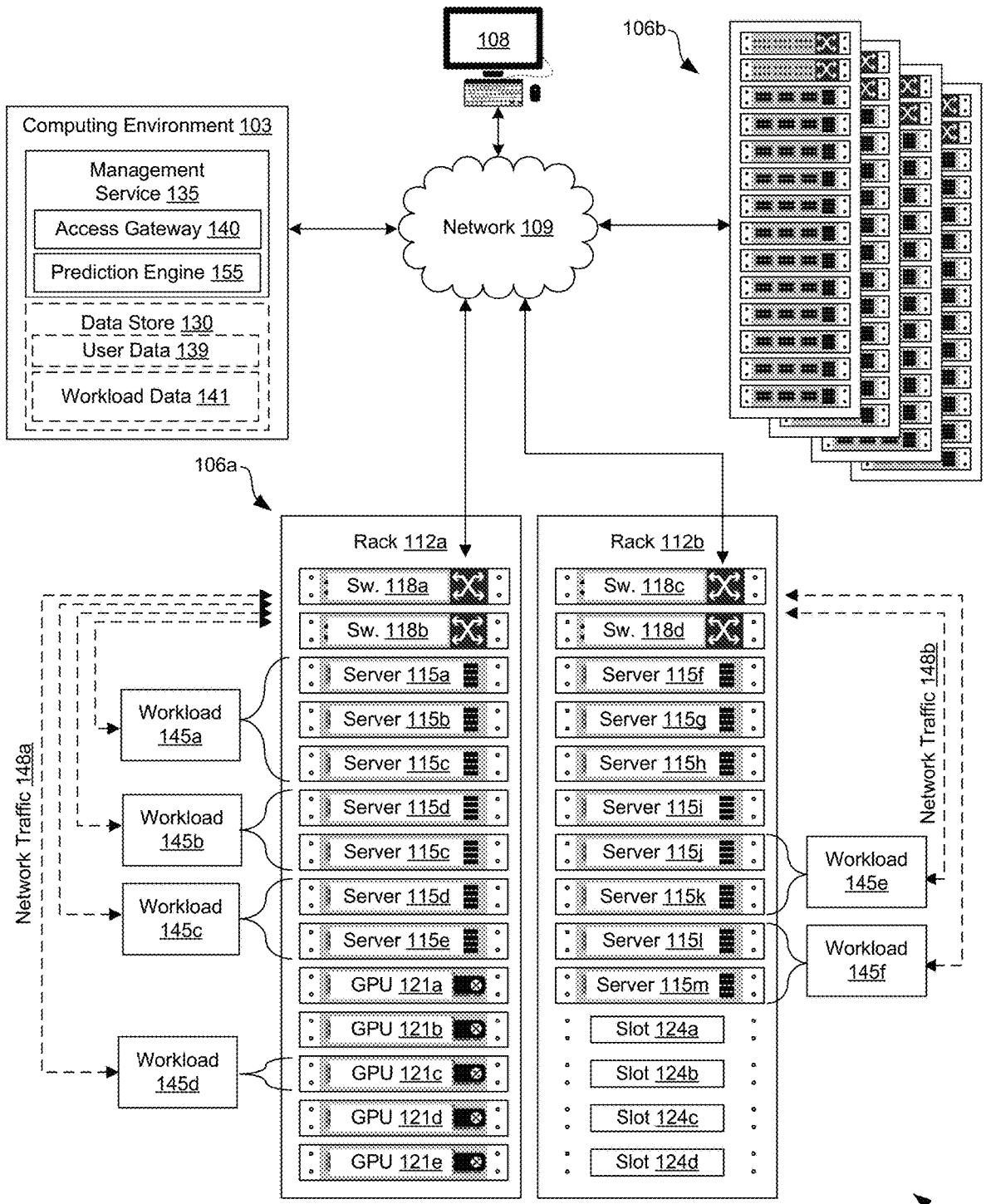
FIG. 1 is a drawing of an example of a virtual desktop infrastructure (VDI) environment for predictive allocation of computing resources for virtual machines.

The present disclosure relates to the predictive allocation of computing resources in computing environment. The computing environment can provide a virtual desktop infrastructure (VDI) environment, another type of virtualized environment, or other computing services to users of an enterprise. As one example, various organizations are moving away from providing and maintaining purely physical desktops for their user bases and, instead, are moving towards providing VDI environments. As another example, an organization might utilize one or more virtual machines (VMs) to provide other types of computing services to its users, such as email access, development environments, testing environments, or other services that are deployed in one or more virtual or physical data centers.

As users and workforces become increasingly geographically dispersed and increasingly mobile, their locations can change more often. In an enterprise environment that relies upon users to access a computing environment, such as a VDI environment, a virtual machine environment, or other computing environments that rely on network interconnectivity, access to these resources is important. Additionally, providing a user experience with low latency can be important for user productivity. Some virtualization solutions rely on distributed resource scheduler (DRS) or distributed power management (DPM) services, as well as other similar hypervisor services, to optimize hardware resources and redistribute virtual machines among the physical servers for dynamic workloads. Some DRS services are able to forecast CPU and memory utilization; however, conventional approaches are limited in virtual desktop infrastructure environments. For instance, DRS and DPM services are not capable of assessing the location of the user in a predictive manner, which can greatly impact the latency experienced by the user.

In VDI environments, reducing latency experienced by the user can be especially important to the user experience. In a VDI scenario, every keystroke and user input can be sent to a remotely executed VDI server or machine that is running a VDI session for the user. A client device of the user running a VDI client interacts with the VDI server and reflects each keystroke and user input on the display of the client device. In this use-case, a high latency situation can seriously degrade the user experience. Though DPM and DRS services can attempt to redistribute VMs to save computing resources or for other reasons, they again cannot make predictions about from where a user might access a VDI session. Their capabilities are limited, especially in context of a virtual desktop infrastructure environment. For instance, as virtual desktop infrastructure environments move towards stateless desktops, an end user is not bound to a particular virtual machine or, in other words, an end user can log-on to any virtual machine and all the application and user data will be retained and provided to the user, regardless of which virtual machine accessed. In a virtual desktop infrastructure environment, a virtual machine is only needed when being actively used by an end user.

According to various examples provided herein, a computing environment can identify usage patterns of virtual machines (VMs), as well as users of those virtual machines, in a virtual desktop infrastructure environment. In some examples, the computing environment can generate a predictive usage model to forecast a predicted location of a user at a future time. The overall efficiency of the virtualization environment is improved as computing resources are more efficiently allocated while the operational cost for running a data center can be reduced due to the reduction in energy costs. Additionally, by determining geographic locations for end users, virtual machines can be assigned to end users based on geographic location, thereby reducing network latency in virtual desktop sessions. Thus, the present application, and the examples described herein, are directed to improving the performance of a computer network, namely, by improving the efficiency and operation of hosts and related computing resources in a data center that provides, for instance, a virtualization environment that provides virtual desktop sessions for end users.

With reference to FIG. 1, an example of a networked environment 100 is shown. The networked environment 100 can include a computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment or computing environment.

In various embodiments, the computing systems 106 can include a plurality of devices installed in racks 112 which can make up a server bank, computing cluster, or a computer bank in a data center or other like facility. The devices in the computing systems 106 can include any number of physical machines, virtual machines, and software, such as operating systems, drivers, hypervisors, and computer applications. In some examples, a computing environment 103 can include an enterprise computing environment that includes hundreds or even thousands of physical machines, virtual machines, and other software implemented in devices stored in racks 112, distributed geographically and connected to one another through the network 109. It is understood that any virtual machine is implemented using at least one physical device.

The devices in the racks 112 can include, for example, memory and storage devices, servers 115a . . . 115m, switches 118a . . . 118d, graphics cards (having one or more GPUs 121a . . . 121e installed thereon), central processing units (CPUs), power supplies, and similar devices. The devices, such as servers 115 and switches 118, can have dimensions suitable for quick installation in slots 124a . . . 124d on the racks 112. In various examples, the servers 115 can include requisite physical hardware and software to create and manage a virtualization infrastructure. The physical hardware for a server 115 can include a CPU, graphics card (having one or more GPUs 121), data bus, memory, and other components. In some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112.

Additionally, if a server 115 executes a virtual machine, the server 115 can be referred to as a "host," while the virtual machine can be referred to as a "guest." Each server 115 that acts as a host in the networked environment 100, and thereby includes one or more guest virtual machines, can also include a hypervisor. In some examples, the hypervisor can be installed on a server 115 to support a virtual machine execution space within which one or more virtual machines can be concurrently instantiated and executed. In some examples, the hypervisor can include VMware ESX™ hypervisor or a VMware ESXi™ hypervisor. It is understood that the computing systems 106 are scalable, meaning that the computing systems 106 in the networked environment 100 can be scaled dynamically to include additional servers 115, switches 118, GPUs 121, power sources, and other components, without degrading performance of the virtualization environment.

Similarly, the computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 the computing systems 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in some examples, the computing environment 103 can be implemented in servers 115 of a rack 112 and can manage operations of a virtualized computing environment. Hence, in some examples, the computing environment 103 can be referred to as a management cluster in the computing systems 106. In some examples, the computing environment 103 can include one or more top-of-rack (TOR) devices.

The servers 115 of a rack 112 can also provide data storage services for the purpose of storing user data, data relating to workloads 145, and other data. The data can be replicated across different data centers or computing systems 106 that are geographically dispersed. In some cases, a storage area network (SAN) or virtual storage area network (vSAN) can be implemented across different computing systems 106 and/or racks 112. The data stored across the computing systems 106 can include virtual machine images, data accessed by the VM images, VDI images, VDI environments, applications, services, containers, and other data, applications, and services that are utilized by users of the enterprise.

The data can be hosted in certain hosts servers 115 or hosts depending upon where users who access certain data or applications are generally located. For example, a data center providing a VDI environment for users in a particularly city can be located in or near that city rather than on a different continent. Geographic and network proximity to the end users can assist with improving network latency and improve the user experience for users utilizing the data and applications that they generally need. An administrator, when planning a network architecture, can assess what applications and services are generally utilized by its users and locate the applications and data near the respective user populations' physical locations.

The computing environment 103 can include a data store 130. The data store 130 can include memory of the computing environment 103, mass storage resources of the computing environment 103, or any other storage resources on which data can be stored by the computing environment 103. The data store 130 can include memory of the servers 115 in some examples. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, user data 139 and workload data 160. User data 139 can store or reference information about the user of an enterprise, such as the user's calendar, email, and other user data. Additionally, user data 139 can include usage logs having records of user interactions with a VDI session served up by the computing systems 106, VMs provided by the computing system 106, or other types of workloads 145. User interactions can include, for example, log-on requests, log-off requests, particular actions performed in a virtualized desktop session, periods of activity or inactivity, as well as other interactions. Each interaction can be stored in the data store 130 in association with a timestamp describing the time the user interaction was performed. One or more location signals associated with the user's location can also be stored in the data store 130 as user data 139.

Workload data 141 can include metadata about the workloads 145 that are deployed across the computing systems 106 in an enterprise deployment. Workloads 145 can include VMs, VDI sessions, containerization services, applications, and other computing resources that users may require. The workload data 141 can identify which server 115, GPU 121, or set of servers 115 and GPUs 121 on which a particular workload 145 is executed. Accordingly, if a user attempts to access a VDI session through the access gateway 140, the access gateway 140 can consult the workload data 141 to determine which server 115 to direct the user's request and where the user's VDI session will be executed.

The components executed on the computing environment 103 can include, for example, a management service 135 as well as other applications, services, processes, systems, engines, or functionality not discussed in detail herein. The management service 135 can be executed to oversee the operation of the networked environment 100 through management of the computing systems 106 as well as the devices and software that make up the computing systems 106. In some examples, an enterprise, organization, or other entity, can operate the management service 135 to oversee or manage the operation of devices in the racks 112, such as servers 115, switches 118, GPUs 121, power supplies, cooling systems, or other components. Through the management service 135, information technology (IT) personnel or other administrators can create virtual desktops, VMs, or other computing resources in a data center capable of being delivered to and accessed by employees or other individuals.

For example, through virtual desktops, end users can be provided with a familiar, personalized environment that they can access from any number of devices from any location while the administrators gain centralized control, efficiency, and security by having desktop data in the data center. However, as users are mobile, locating the user's VDI session to a server 115 in relative proximity to the user's location can improve network latency between the user's client device 108 and the server 115. Additionally, as users become mobile, their location on a given day is not always known in advance. Accordingly, the management service 135, through the prediction engine 115 can generate a predicted location for users so that workloads 145 such as a VDI session can be located in a computing system 106 that optimizes latency to the user's client device 108.

Therefore, in some examples, the management service 135 can include one or more access gateways 140 and a prediction engine 155. The access gateway 140 can include an application or other service that acts as a broker for client connections by authenticating and directing incoming user requests to an appropriate virtual machine, virtual desktop, or server 115. The access gateway 140 can include an application or other service that serves any request from a client device 108 for a virtual desktop. The VDI gateway 140 and/or the desktop manager 142 can be configured to store data pertaining to requests from the client devices 108 in the usage log 138. The data stored in the usage log 138 can include, for example, a type of request performed, a timestamp at which the request was received, as well as other information.

The management service 135 can also include a usage analysis engine 150 and a prediction engine 155. The prediction engine 155 can process data from user data 129, such as usage logs, a user's calendar, external data sources, or third party hosted services with which the user has an account to generate a predicted location of the user. The prediction engine 155 can utilize a predictive usage model that generates predicted location of the user for a particular point in time in the future based on the user's past behavior and an analysis of the user data 129 corresponding to the user. A predictive usage model can comprise a machine learning model that receives the user data 129 and data from external sources as inputs. The model can generate a predicted location as its output and be trained by the actual location of other users in the enterprise user population and the respective user data 129 of the same enterprise user population. The prediction engine 155 can apply the predictive usage model to forecast where one or more workloads 145 that the user is likely to utilize should be located within a geographically dispersed set of computing systems 106. Once a predicted location is generated, the prediction engine 155 can also assess the network conditions of the predicted location.

Once an analysis of the predicted location and the corresponding network conditions of the location are assessed, the prediction engine 155 can also utilize the capabilities of the management service 135 to locate the workloads 145 that the user is expected to utilize on one or more servers 115 to optimize the user experience. In some embodiments, optimizing the user experience involves locating the workloads 145 on a server such that predicted network latency is minimized. Therefore, in the case of a VDI session and the corresponding data needed by the VDI session of the user, both can be relocated to available servers 115 in a rack 112 or computing system 106 that is closest to the predicted location or that which has the lowest latency to a hypothetical client device 108 located in the predicted location. The lowest latency to the hypothetical client device 108 can be identified by assessing network latency to one or more network addresses in a geographical area to which the computing system 106 can connect in the geographical area. These network addresses can include VPN access points, other servers, test endpoints, or other client devices 108 of other users in the geographical area.

Various physical and virtual components of the computing systems 106 can process workloads 145a ... 145f. Workloads 145 can refer to an application or process that a server 115, switch 118, GPU 121, or other physical or virtual component that have been deployed onto hardware within a computing system 106 or data center. The management service 135 can orchestrate deployment and management of workloads 145 onto servers 115 across a fleet of servers 115 in various geographic locations and data centers. The workloads 145 can be associated with virtual machines or other software executing on the servers 115. For instance, the workloads 145 can include tasks to be processed to provide users of an enterprise with remote desktop sessions or other virtualized computing sessions. The workloads 145 can also represent containerized applications that are running to provide services to users of the enterprise.

In some instances, a workload 145 can require multiple servers 115 to execute. In other instances, a workload 145 can be executed on a single server 115. In many cases, multiple workloads 145, such as multiple VDI sessions, can be deployed on a single server 115 and on data storage resources within the same rack 112 as the server 115.

The management service 135 can maintain a listing of active or inactive workloads 145 as well as oversee the assignment of various workloads 145 to various devices in the computing systems 106. For instance, the management service 135 can assign a workload 145 lacking in available resources to a server 115 that has resources sufficient to handle the workload 145. The workloads 145 can be routed to various servers 115 by the switches 118 as network traffic 148a . . . 148b.

Figure 2:
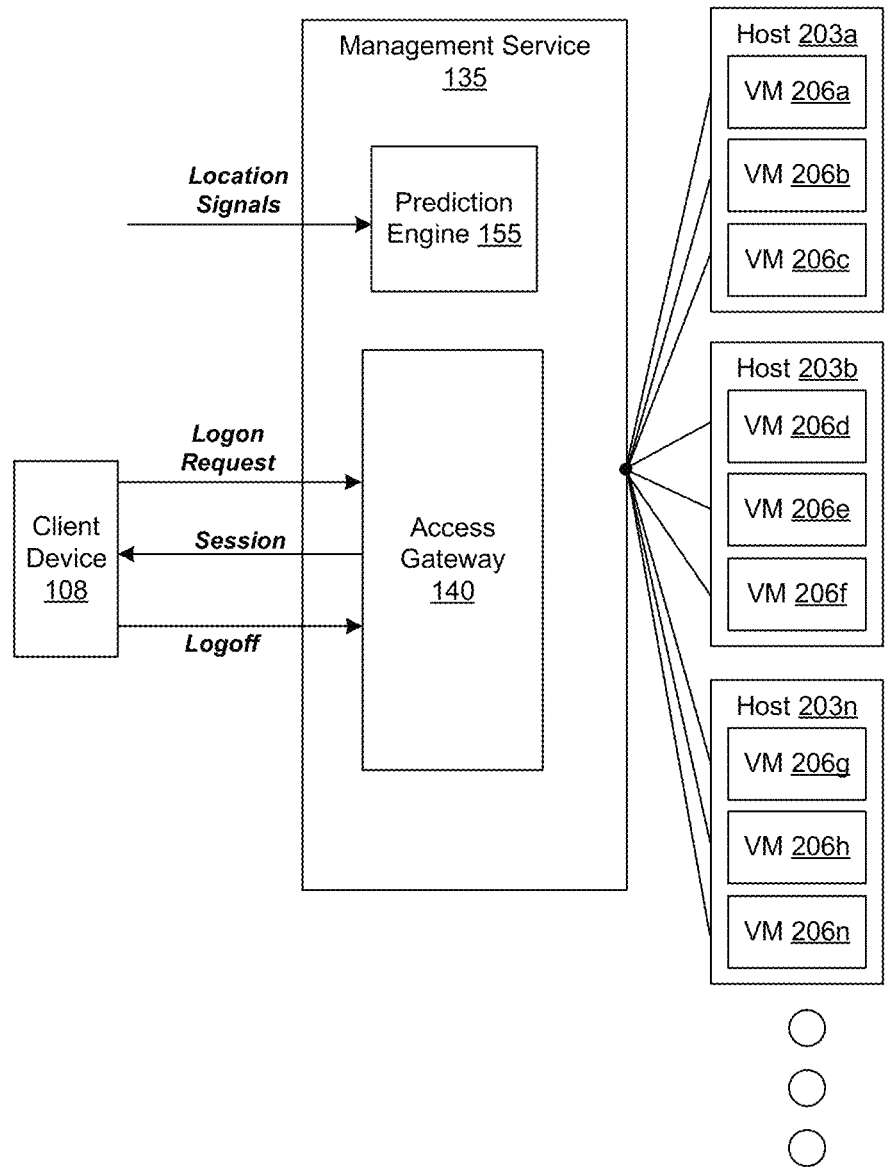
FIG. 2 is a drawing showing an example architecture for predictive allocation of computing resources in a computing environment.

Referring next to FIG. 2, a diagram 200 is provided showing an example of computing architecture for predictive allocation of computing resources according to the disclosure. Again, the computing resources can involve workloads 145, such as VDI sessions, VMs, or other applications and services that are executed by a computing system 106 to provide data and services to a client device 108 of a user. In FIG. 2, the diagram 200 can include includes hosts 203a . . . 203n (collectively "hosts 203") which can include servers 115 which can execute one or more virtual machines 206a . . . 206n. The virtual machines 206 can provide a VDI session or other computing resources when requested by a client device 108. In one example, a client device 108, through a client application running on the client device 108, can send a log-on request to the access gateway 140, which can authenticate the user or client device 108. The access gateway 140 can identify one of the virtual machines 206 to utilize in serving up a virtual desktop for the client device 108. The virtual machines 206 selected by the access gateway 140 can be selected based upon the user account associated with the user and where the user account has been assigned a host 203.

The access gateway 140 can select the appropriate host 203 based upon the workload data 141, which can store a host assignment that relates the requested workload and a host 203. The host assignment can be based on properties of the user account associated with the logon request. The host assignment can be generated by the management service 135 based on an office location assigned to the user, which can be reflected in the user data 139. The host assignment can have a default location based on the assigned office location of the user, which can be an office of the enterprise or a geographic area if the user is a remote user. The host assignment can assign the user to a particular data center in a particular geographic location that is nearest to the user's assigned location.

According to examples of this disclosure, the prediction engine 155 can receive location signals that are associated with a user account. Location signals can include usage data associated with a client device 108, such as the location of the client device, the data accessed by the client device, the workloads or VMs utilized by the device, and other signals. The location signals can allow the prediction engine 155 to generate a predicted location associated with the user account or the client device 108 that is associated with the user account. The location signals can take various forms. In one example, a location signal can be a location indication on a calendar event on the user's calendar. As noted above, the user data 139 can store or reference the user's enterprise calendar, which can include meetings, events, and appointments. Accordingly, the prediction engine 155 can take as an input the location of a calendar event at a particular time or day on the user's calendar to generate a predicted location of the user.

As another example, another location signal can include a location indication received from a radio frequency identification (RFIC) RFID or near field communication (NFC) reader that can obtain a swipe or tap from an employee badge, ID card, or client device 108. If the location of the reader is known, when the user authenticates an identifier with the reader, a location signal can be input into the prediction engine 155 as an indication that the user is located in or near the location of the reader. For example, many buildings and facilities of an enterprise have physical access control systems that require the user to tap or swipe a badge to authenticate with a reader that unlocks a door or entrance gate. Accordingly, an indication from a reader or access control system that a user has authenticated with the reader can be input as a location signal to the prediction engine 155.

Another location signal can include a network address of a client device 108 that is used by the client device 108 when accessing a network accessible service of the enterprise. For example, the network address of the client device 108 can be determined by identifying a network address through which the client device 108 communicates with the management service 135. The network address can be determined using IP address header or other connection properties associated with the client device. Accordingly, a physical or geographic location can be estimated or determined from the network address of the client device 108. Therefore, the network address can be provided as a location signal to the prediction engine 155.

Another location signal can include virtual private network (VPN) usage associated with the user or client device 108 of the user. The enterprise might require mobile users to utilize a VPN capability to access network resources or to secure network traffic coming from or to the client device 108. A VPN gateway can record a network address or a location of a client device 108 that is accessing a VPN capability provided by the enterprise. Accordingly, a physical or geographic location can be estimated or determined from the properties of a VPN connection between the client device 108 and a VPN gateway. Therefore, the properties of a VPN connection can be provided as a location signal to the prediction engine 155.

Another example of a location signal can include data from third party data sources, such as weather data, data about network conditions between the client device 108 and the access gateway 140. If inclement weather is imminent in a physical location associated with the client device 108, this can be a signal that the workload 145 utilized by the user account associated with the client device 108 should be relocated or reconfigured. If network conditions associated with the client device 108 are degraded such that bandwidth or latency does not meet a bandwidth threshold or latency threshold, this can also be provided to the prediction engine 155 as a location signal.

Another example of a location signal can include the current physical or geographic location of a client device 108. The client device 108, in some scenarios, can periodically reports its location to the management service 135 or a service with which the client device 108 is enrolled as a managed device. Accordingly, the location history of the client device 108 can also be provided to the prediction engine 155 as a location signal.

The prediction engine 155 can also receive data about a user account from third party hosted services that a user is associated with. For example, an enterprise can provide accounts in third party hosted services, such as a customer relationship management tool. Access to these accounts can be accomplished through a federated authentication scheme. Accordingly, a data engine can obtain data from various third party services utilizing an authentication token on behalf of a user account and feed data related to the user's location into the prediction engine 155 as location signals.

The prediction engine 155, using the location signals that are provided as inputs, can utilize a machine learning model to generate a predicted location for users. The predicted location can be generated daily at the start of a user's typical workday. The machine learning model can be trained using historical location data of a population of users and/or client devices 108 within the enterprise and the location signals corresponding to the historical location data for those users. The machine learning model can also be retrained on an ongoing or periodic basis using the location history of users and/or client devices 108. In this sense, the machine learning model can comprise an online learning model that continues to train on new detected locations or incorrectly predicted VM transfers as that data is made available. Accordingly, the model can be dynamically updated and trained on newer data regarding physical locations, network locations, or resultant latency experienced by users.

For new users who will not have any location history, a general model trained on aggregated data from all other employees can be used as a starting point for predictions until location history is accumulated for the user. In this scenario, user data such as job title, position, etc., could be used to find similar employees in the company and borrow their model as a starting point.

The prediction engine 155 can generate predicted location for a user and then take action with respect to VMs 206 or workloads 145 with which the user is associated. For example, the prediction engine 155 can determine that a predicted location has changed. The prediction engine 155 can also assess the predicted latency in the predicted location for a client device 108 associated with the user account to access VMs 206 associated with services that are reflected in a historical usage pattern of the user. The assessment can involve determining whether a host 203 that is closer to the predicted location is available to host the VMs 206 that are expected to be used by the user and migrating the VMs 206 or other workloads 145 to the closer host 203. The migration can be performed by the prediction engine 155 prior to business hours so that the VMs 206 are migrated before the user needs to use them. The VMs 206 that are migrated can be associated with a VDI session of the user or other computing services or resources that are provided to the user.

The assessment can also involve calculating a predicted latency to a hypothetical client device 106 in the predicted location. The lowest latency to the hypothetical client device 108 can be identified by assessing network latency to one or more network addresses in a geographical area to which the computing system 106 can connect in the geographical area. These network addresses can include VPN access points, other servers, test endpoints, or other client devices 108 of other users in the geographical area.

In some cases, the prediction engine 155 can determine that latency to a client device 108 in the predicted location is simply too degraded to provide an acceptable user experience. The prediction engine 155 can make this determination by assessing whether network conditions associated with a hypothetical client device 108 in the predicted location are degraded such that bandwidth or latency do not meet a bandwidth threshold or latency threshold. In this scenario, rather than simply migrating the VMs 206 used by the user to another host 203, the prediction engine 155 can obtain data needed for the VM 206 to be executed on the client device 108 in a VM client. The prediction engine 155 can then obtain a copy of a VM image and transmit the VM image to the client device 108. The VM image can be pushed to the client device 108 or provided as a download option once the user requests access to a VDI session, VM, or other computing resource through the access gateway 140. The client device 108 can then execute the VM image using a VM client on the client device 108.

The prediction engine 155 can also migrate data accessed by a user using a client device 108 in addition to VMs 206 and workloads 145. The prediction engine 155 can migrate the files and data that are accessed by the user to a host 203 that is closer to the predicted location generated by the prediction engine 155. By migrating data in addition to workloads 145, the prediction engine 155 can optimize the user experience for network-accessible applications and data. In some embodiments, the prediction engine 155 can migrate recently accessed files or all files associated with a user account. In other embodiments, the prediction engine 155 can replicate files to a host 203 that is geographically closer to the predicted location rather than migrating or moving them.

In addition to migrating data and/or VMs 206 to hosts 203 that are closer to the predicted location, the prediction engine 155 can also migrate data and VMs 206 to hosts 203 that may not be physically closer to the predicted location but that have a lower expected latency to the predicted location. The prediction engine 155 can identify a host 203 or set of hosts 203 having the lowest expected latency by performing a network test to one or more network addresses in various geographical areas to which the computing system 106 can connect. These network addresses can again include VPN access points, other servers, test endpoints, or other client devices 108 of other users in the geographical area.

The prediction engine 155 can also migrate data and VMs 206 to hosts 203 that may not be physically closer to the predicted location based on policy reasons. For example, privacy or data security policies might mandate that a user's VMs 206 or data be located in a particular jurisdiction because migrating data outside of a certain region could create privacy or regulatory issues for the enterprise. In this scenario, the VMs 206 and data should be migrated to the best hosts 203 from a latency perspective that are located within permitted jurisdictions or physical location. From a data security perspective, data security concerns of the enterprise might cause the enterprise to have a policy in place that prohibits the VMs 206 or data to be located on hosts 203 within a particular country or region.

Figure 3:
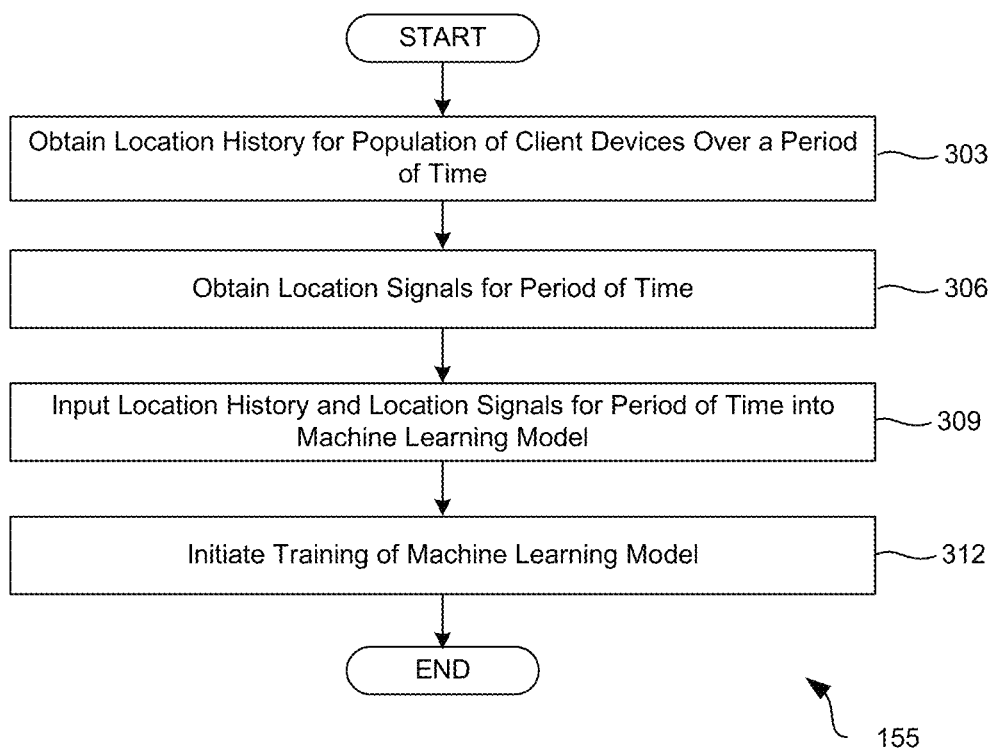
FIG. 3 is a flowchart illustrating functionality implemented by components of the environment of FIG. 1.

Moving on to FIG. 3, shown is a flowchart that provides one example of the operation of a portion of the networked environment 100. The flowchart of FIG. 3 can be viewed as depicting an example of elements of a method implemented by the management service 135 or the prediction engine 155 executing in the computing environment 103 according to one or more examples. FIG. 3 illustrates how the prediction engine 155 can train a machine learning model that can generate location predictions for client devices 108 that are associated with user accounts in an enterprise. The separation or segmentation of functionality as discussed herein is presented for illustrative purposes only.

Beginning with step 303, the prediction engine 155 can obtain a location history over a period of time for a population of client devices 108 associated with the enterprise. The location history can be collected from devices that are enrolled as managed devices with a device management service. Additionally, the location history can also include location predictions that were previously generated by the prediction engine 155. In this way, a portion of the training data used to train the machine learning model can include previous location predictions generated by the model. Accordingly, this portion of the training set can also identify whether the previous location predictions were accurate.

Next, at step 306, the prediction engine 155 can obtain location signals over the period of time for the population of client devices 108 associated with the enterprise. The location signals data that the prediction engine 155 can use to generate predicted locations. In some embodiments, the data provided to the machine learning model as training data can also include an indication of network latency experienced by the client device 108 in its interactions with a host 203 that was assigned to handle a user's request for a computing resource. In this way, a portion of the training data used to train the machine learning model can include latencies previously experienced by the client devices 108 so that the model can be trained to take steps to improve latency. To this end, the training data can further include the steps that were taken to migrate a VM or generate a VM image for execution by the client device 106 as a part of the training data.

In step 309, the location history and the location signals corresponding to the period of time can be input as training data into the machine learning model. The model can be a supervised learning, an unsupervised learning, a semi-supervised learning, or a reinforcement learning model. Different model types can require different filters or sets of training data. Accordingly, the type of training data provided to the machine learning model can be varied according to how the model is configured to learn. In general, the model can be setup to generate location predictions that are accurate as well as generate the location predictions to optimize for the lowest possible network latency. Therefore, the location predictions generated by the model may not be the most geographically accurate as long as the model is optimizing for network latency.

In step 312, the prediction engine 155 can initiate training of the machine learning model. The prediction engine 155 can train the model on an ongoing basis as location predictions are being generated by the model and new training data is generated through usage of the computing systems 106. In other examples, the prediction engine 155 can periodically train the model to free computing resources for the model to generate location predictions. Thereafter, the process can proceed to completion.

Figure 4:
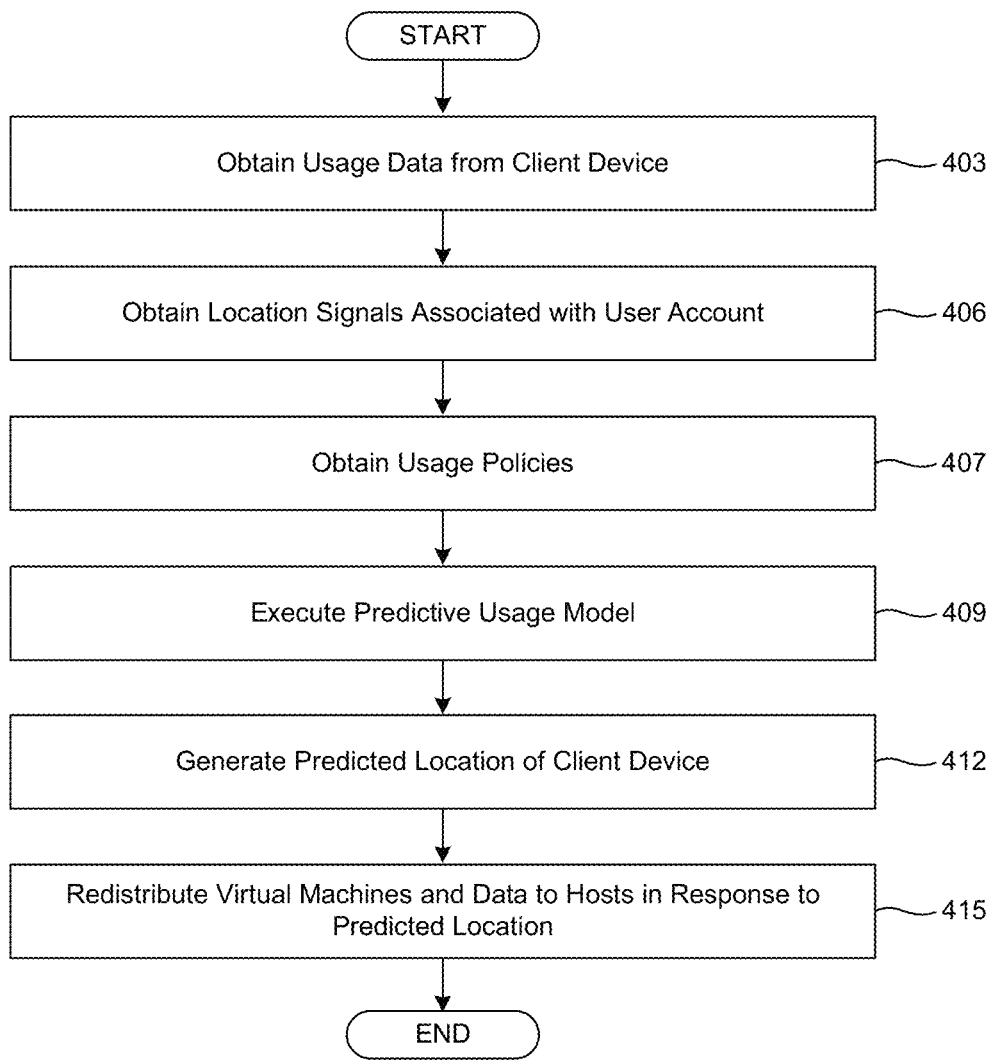
FIG. 4 is a flowchart illustrating functionality implemented by components of the environment of FIG. 1.

Turning now to FIG. 4, shown is a flowchart that provides one example of the operation of a portion of the networked environment 100. The flowchart of FIG. 4 can be viewed as depicting an example of elements of a method implemented by the prediction engine 155 executing in the computing environment 103 according to one or more examples. FIG. 4 illustrates how the prediction engine 155 can generate location predictions and optimize the deployment of resources in a computing environment based on the changing location of users. The separation or segmentation of functionality as discussed herein is presented for illustrative purposes only.

The prediction engine 155 can use the machine learning model to forecast the location of client devices 108, and therefore users, to optimize the deployment of resources within an enterprise environment. These resources can include VDI sessions, VMs, data, applications, or other services deployed across data centers by an enterprise. Additionally, the prediction engine 155 can be configured to generate a location prediction on behalf of a particular user account each day, week, month, etc., at a particular time of day. Additionally, the prediction engine 155 can also be configured to migrate a workload or data similarly periodically at a particular time of day. At step 403, the prediction engine 155 can obtain usage data from a client device 108 for which it is generating a location prediction. The usage data can include information that can serve as location signals to feed into the machine learning model. For example, the current location of the client device 108 can serve as a location signal in addition to information about what network the client device 108 is currently communicating with.

At step 406, the prediction engine 155 can obtain other location signals associated with the user account. The other location signals, as noted above, can include data from user data 139, such as calendar data, and employee badge data, and information from third party sources, such as information from federated services associated with the user and external data sources.

At step 407, the prediction engine 155 can obtain one or more usage policies associated with the user account. The usage policies can specify whether VMs, data, or workloads 145 are not permitted to be located in certain geographical locations or regions for policy, legal, or regulatory reasons, such as data security policies or data privacy policies.

At step 409, the prediction engine 155 can execute the predictive usage model, which can be the machine learning model, to generate a location prediction associated with the user account. The machine learning model can generate a location prediction for a client device 108 associated with a user account based upon the location signals for the user account and the usage data associated with the client device 108. The location prediction can be associated with a client device 108 that is primarily used by a user. To this end, the prediction engine 155 can identify the most often or most recently used client device 108 associated with a user account for which the location prediction should be generated.

At step 412, the prediction engine 155 can generate the predicted location associated with the client device 108. The predicted location can be used by the prediction engine 155 to later optimize computing resource to optimize for latency.

At step 415, the prediction engine 155 can redistribute VMs or workloads 145 to different hosts 203 in response to the location prediction generated by the prediction engine 155. The prediction engine 155 can migrate the VMs 206 or other workloads 145 used by the user to another host 203 that is either closest to the predicted location or that has the lowest expected latency based upon the predicted location. As noted above, if the expected latency is worse than a threshold latency for any host, the prediction engine 155 can generate executable versions of the workloads 145 that can run on the client device 106 rather than on a host. Additionally, the prediction engine 155 can also take into account the usage policies that might specify certain locations or regions where the workloads 145 are not permitted to be placed for regulatory or legal reasons.

Additionally, in the latter scenario, the prediction engine 155 can obtain data needed for the VM 206 to be executed on the client device 108 in a VM client. The prediction engine 155 can then obtain a copy of a VM image and transmit the VM image to the client device 108. The VM image can be pushed to the client device 108 or provided as a download option once the user requests access to a VDI session, VM, or other computing resource through the access gateway 140.

In addition to migrating workloads 145, the prediction engine 155 can also migrate data accessed by a user using a client device 108 in addition to VMs 206 and workloads 145. The prediction engine 155 can migrate the files and data that are accessed by the user to a host 203 that is closer to the predicted location generated by the prediction engine 155. By migrating data in addition to workloads 145, the prediction engine 155 can optimize the user experience for network-accessible applications and data. In some embodiments, the prediction engine 155 can migrate recently accessed files or all files associated with a user account. In other embodiments, the prediction engine 155 can replicate files to a host 203 that is geographically closer to the predicted location rather than migrating or moving them. Thereafter, the process proceeds to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device;
   program instructions stored in memory and executable in the at least one computing device that, when executed by the at least one computing device, cause the at least one computing device to:
      obtain usage data associated with a user account in a computing environment, the usage data of a client device associated with the user account;
      execute a predictive usage model associated with at least one virtual machine that provides a computing resource to the user account in the computing environment, the predictive usage model generating a prediction location of the client device;
      determine a plurality of location properties associated with the predicted location;
      allocate at least one computing resource based upon the predictive usage model and the plurality of location properties such that the at least one virtual machine is available at a future time associated with the predicted location of the client device;
      generate a virtual machine instance executable on the client device in response to determining that network latency associated with the predicted location is worse than a threshold latency; and
      transmit the virtual machine instance to the client device, wherein the client device is configured to execute the virtual machine instance in a virtual machine environment on the client device.

2. The system of claim 1, further comprising program instructions that, when executed by the at least one computing device, cause the at least one computing device to redistribute the at least one virtual machine from a first host to a second host, wherein the second host achieves improved latency with the client device from the predicted location.

3. The system of claim 1, wherein the predictive usage model comprises a machine learning model that generates the predicted location based upon at least one location signal that is input to the machine learning model.

4. The system of claim 3, wherein the at least one location signal comprises an event location associated with a calendar event associated with the user account, or a location associated with a radio-frequency identifier (RFID) tag reader or a near-field communication (NFC) reader that captured a RFID tag or a NFC tag associated with the user account, a signal that environmental conditions at the predicted location that affect predicted network latency.

5. The system of claim 1, wherein the at least one virtual machine provides a virtual desktop infrastructure (VDI) environment for the user account, wherein the VDI environment is accessed using a VDI client executed by the client device.

6. The system of claim 5, further comprising program instructions that, when executed by the at least one computing device, cause the at least one computing device to allocate at least one computing resource based upon the predictive usage model by migrating a VDI session associated with the user account to a host device that has a location with the lowest latency in relation to the predicted location.

7. A non-transitory computer-readable medium for predictive allocation of computing resources in a virtual desktop infrastructure environment, comprising embodying program code executable in at least one computing device that, when executed by the at least one computing device, causes the at least one computing device to:
   obtain usage data associated with a user account in a computing environment, the usage data of a client device associated with the user account;
   execute a predictive usage model associated with at least one virtual machine that provides a computing resource to the user account in the computing environment, the predictive usage model generating a prediction location of the client device;
   determine a plurality of location properties associated with the predicted location;
   allocate at least one computing resource based upon the predictive usage model and the plurality of location properties such that the at least one virtual machine is available at a future time associated with the predicted location of the client device;
   generate a virtual machine instance executable on the client device in response to determining that network latency associated with the predicted location is worse than a threshold latency; and
   transmit the virtual machine instance to the client device, wherein the client device is configured to execute the virtual machine instance in a virtual machine environment on the client device.

8. The non-transitory computer-readable medium of claim 7, further comprising program code that, when executed by the at least one computing device, causes the at least one computing device to redistribute the at least one virtual machine from a first host to a second host, wherein the second host achieves improved latency with the client device from the predicted location.

9. The non-transitory computer-readable medium of claim 7, wherein the predictive usage model comprises a machine learning model that generates the predicted location based upon at least one location signal that is input to the machine learning model.

10. The non-transitory computer-readable medium of claim 9, wherein the at least one location signal comprises an event location associated with a calendar event associated with the user account, or a location associated with a radio-frequency identifier (RFID) tag reader or a near-field communication (NFC) reader that captured a RFID tag or a NFC tag associated with the user account, a signal that environmental conditions at the predicted location that affect predicted network latency.

11. The non-transitory computer-readable medium of claim 7, wherein the at least one virtual machine provides a virtual desktop infrastructure (VDI) environment for the user account, wherein the VDI environment is accessed using a VDI client executed by the client device.

12. The non-transitory computer-readable medium of claim 11, further comprising program instructions that, when executed by the at least one computing device, cause the at least one computing device to allocate at least one computing resource based upon the predictive usage model by migrating a VDI session associated with the user account to a host device that has a location with the lowest latency in relation to the predicted location.

13. A method, comprising:
    obtaining usage data associated with a user account in a computing environment, the usage data of a client device associated with the user account;
    executing a predictive usage model associated with at least one virtual machine that provides a computing resource to the user account in the computing environment, the predictive usage model generating a prediction location of the client device;
    determining a plurality of location properties associated with the predicted location;
    allocating at least one computing resource based upon the predictive usage model and the plurality of location properties such that the at least one virtual machine is available at a future time associated with the predicted location of the client device;
    generating a virtual machine instance executable on the client device in response to determining that network latency associated with the predicted location is worse than a threshold latency; and
    transmitting the virtual machine instance to the client device, wherein the client device is configured to execute the virtual machine instance in a virtual machine environment on the client device.

14. The computer-implemented method of claim 13, further comprising redistributing the at least one virtual machine from a first host to a second host, wherein the second host achieves improved latency with the client device from the predicted location.

15. The computer-implemented method of claim 13, wherein the predictive usage model comprises a machine learning model that generates the predicted location based upon at least one location signal that is input to the machine learning model.

16. The computer-implemented method of claim 15, wherein the at least one location signal comprises an event location associated with a calendar event associated with the user account, or a location associated with a radio-frequency identifier (RFID) tag reader or a near-field communication (NFC) reader that captured a RFID tag or a NFC tag associated with the user account, a signal that environmental conditions at the predicted location that affect predicted network latency.

17. The computer-implemented method of claim 13, wherein the at least one virtual machine provides a virtual desktop infrastructure (VDI) environment for the user account, wherein the VDI environment is accessed using a VDI client executed by the client device.

* * * * *